United States Patent
Kim et al.

(10) Patent No.: US 11,437,192 B2
(45) Date of Patent: *Sep. 6, 2022

(54) MULTILAYERED CAPACITOR

(71) Applicant: SAMSUNG ELECTRO-MECHANICS CO., LTD., Suwon-si (KR)

(72) Inventors: Mi Geum Kim, Suwon-si (KR); Byeong Cheol Moon, Suwon-si (KR); Kun Hoi Koo, Suwon-si (KR); Jung Min Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/318,938

(22) Filed: May 12, 2021

(65) Prior Publication Data

US 2021/0265115 A1     Aug. 26, 2021

Related U.S. Application Data

(63) Continuation of application No. 16/537,843, filed on Aug. 12, 2019, now Pat. No. 11,037,732.

(30) Foreign Application Priority Data

Mar. 27, 2019  (KR) .................. 10-2019-0034920
May 9, 2019    (KR) .................. 10-2019-0054166

(51) Int. Cl.
*H01G 4/232*      (2006.01)
*H01G 4/30*       (2006.01)
(Continued)

(52) U.S. Cl.
CPC ........... *H01G 4/2325* (2013.01); *H01G 4/248* (2013.01); *H01G 4/30* (2013.01); *H01G 4/0085* (2013.01); *H01G 4/012* (2013.01); *H01G 4/1227* (2013.01)

(58) Field of Classification Search
None
See application file for complete search history.

(56) References Cited

U.S. PATENT DOCUMENTS 6,259,161 B1 *  7/2001  Wu ................. H05K 3/244
                                                257/784
8,309,164 B2 * 11/2012  Imai ................ C23C 18/32
                                                427/443.1
(Continued)

FOREIGN PATENT DOCUMENTS

JP    2000-277570 A   10/2000
JP    2008-311316 A   12/2008
(Continued)

OTHER PUBLICATIONS

Korean Office Action dated Apr. 25, 2020 issued in Korean Patent Application No. 10-2019-0054166 (with English translation).
(Continued)

*Primary Examiner* — Dion R. Ferguson
(74) *Attorney, Agent, or Firm* — Morgan, Lewis & Bockius LLP (57) ABSTRACT

A multilayered capacitor includes a capacitor body including a plurality of dielectric layers and a plurality of internal electrodes; and external electrodes disposed on both end portions of the capacitor body and connected to exposed portions of the internal electrodes, respectively. Each of the external electrodes includes a conductive layer formed on the capacitor body and connected to the internal electrodes; an inner plated layer including nickel (Ni) and phosphorus (P), and covering the conductive layer; and an outer plated (Continued)

layer including palladium (Pd) and phosphorus (P), and covering the inner plated layer.

14 Claims, 4 Drawing Sheets

(51) Int. Cl.
*H01G 4/248* (2006.01)
*H01G 4/012* (2006.01)
*H01G 4/12* (2006.01)
*H01G 4/008* (2006.01)

(56) References Cited

U.S. PATENT DOCUMENTS

| | | | | |
|---|---|---|---|---|
| 8,759,986 B2* | 6/2014 | Lee | ............ | C23C 18/54 257/781 |
| 8,933,336 B2* | 1/2015 | Yoshida | ............ | H01B 1/02 257/784 |
| 11,037,732 B2* | 6/2021 | Kim | ............ | H01G 4/2325 |
| 2007/0105377 A1* | 5/2007 | Koos | ............ | C23C 18/1893 257/E21.309 |
| 2010/0183898 A1* | 7/2010 | Imai | ............ | C22C 27/04 427/383.5 |
| 2010/0302748 A1* | 12/2010 | Taniguchi | ............ | H01L 23/498 174/257 |
| 2012/0039014 A1* | 2/2012 | Ogawa | ............ | H01G 4/30 361/301.4 |
| 2014/0111300 A1* | 4/2014 | Park | ............ | H01C 1/148 336/200 |
| 2014/0293503 A1* | 10/2014 | Sasabayashi | ............ | H01G 4/232 361/301.4 |
| 2016/0064846 A1* | 3/2016 | Tadokoro | ............ | H01R 13/035 439/886 |
| 2019/0269013 A1* | 8/2019 | Takagi | ............ | H01L 23/15 |
| 2020/0312559 A1* | 10/2020 | Kim | ............ | H01G 4/232 |
| 2021/0265115 A1* | 8/2021 | Kim | ............ | H01G 4/2325 |

FOREIGN PATENT DOCUMENTS

| | | |
|---|---|---|
| KR | 10-1313699 B1 | 10/2013 |
| KR | 10-2014-0049739 A | 4/2014 |
| KR | 10-1771737 B1 | 8/2017 |

OTHER PUBLICATIONS

U.S. Notice of Allowance dated Feb. 10, 2021 issued in U.S. Appl. No. 16/537,843.

U.S. Non-Final Office Action dated Oct. 14, 2020 issued in U.S. Appl. No. 16/537,843.

* cited by examiner

MULTILAYERED CAPACITOR

CROSS-REFERENCE TO RELATED APPLICATIONS

This application is a continuation of U.S. patent application Ser. No. 16/537,843, filed on Aug. 12, 2019, which claims benefit of priority to Korean Patent Application No. 10-2019-0034920 filed on Mar. 27, 2019, and Korean Patent Application No. 10-2019-0054166 filed on May 9, 2019 in the Korean Intellectual Property Office, the disclosures of which are incorporated herein by reference in their entireties.

TECHNICAL FIELD

The present disclosure relates to a multilayered capacitor.

BACKGROUND

In a typical multilayered capacitor, a plated layer of an external electrode may be formed of a nickel plated layer and a tin plated layer, and may use a tin-containing solder (Sn-based solder) in a case of being mounted on a substrate.

In the case of tin-containing solder, problems such as cracks may occur when a reliability at a temperature of 150° C. or higher is required in a product. In recent years, there has been a tendency to use a conductive adhesive mainly containing epoxy and metallic filler, or the like, as a bonding material.

However, when the above-mentioned conductive adhesive is used as the bonding material, and the plated layer of the external electrode is made of tin, a bonding force between the conductive adhesive and the plated layer may be lowered, which may cause a problem of increasing a mounting failure of the multilayered capacitor.

SUMMARY

An aspect of the present disclosure is to provide a multilayered capacitor capable of preventing a decrease in bonding force between a conductive adhesive and a plated layer to prevent a mounting failure, even when high reliability is required in a case in which the multilayered capacitor is mounted on a substrate using a conductive adhesive.

According to an aspect of the present disclosure, a multilayered capacitor includes a capacitor body including a dielectric layer and a plurality of internal electrodes; and a plurality of external electrodes disposed on both end portions of the capacitor body and connected to exposed portions of the internal electrodes. Each of the external electrodes includes a conductive layer disposed on the capacitor body and connected to the internal electrodes; an inner plated layer including nickel (Ni) and phosphorus (P), and covering the conductive layer; and an outer plated layer including palladium (Pd) and phosphorus (P), and covering the inner plated layer.

In an embodiment of the present disclosure, the inner plated layer may have a phosphorus content of more than 4% by weight and 8% by weight or less, based on a total weight of the inner plated layer.

In an embodiment of the present disclosure, the inner plated layer may mainly contain nickel (Ni) and include phosphorus (P) as an impurity dispersed in the inner plated layer.

In an embodiment of the present disclosure, the capacitor body may include first and second surfaces facing each other, third and fourth surfaces connected to the first and second surfaces and facing each other, and fifth and sixth surfaces connected to the first and second surfaces and connected to the third and fourth surfaces, and may include the plurality of internal electrodes alternately exposed through the third and fourth surfaces of the capacitor body with the dielectric layer interposed therebetween.

In an embodiment of the present disclosure, the conductive layer of the external electrodes may include connection portions respectively disposed on the third and fourth surfaces of the capacitor body and connected to the exposed portions of the internal electrodes, and bent portions extending from the connection portions to a portion of the first surface of the capacitor body.

In an embodiment of the present disclosure, the inner plated layer may be formed by plating a first metal layer including nickel and phosphorus on the conductive layer by an electroless plating process, and the outer plated layer may be formed by plating a second metal layer including palladium and phosphorus on the inner plated layer by an electroless plating process.

In an embodiment of the present disclosure, the conductive layer may include at least one of copper and silver.

In an embodiment of the present disclosure, the inner plated layer may have a thickness of 1 μm to 10 μm.

In an embodiment of the present disclosure, a thickness of the inner plated layer may be greater than a thickness of the outer plated layer.

In an embodiment of the present disclosure, the outer plated layer may have a phosphorus content of 2% by weight or more and 6% by weight or less, based on a total weight of the outer plated layer.

In an embodiment of the present disclosure, the outer plated layer may mainly contain palladium (Ni) and include phosphorus (P) as an impurity dispersed in the outer plated layer.

In an embodiment of the present disclosure, each of the external electrodes may not contain a tin (Sn) layer.

According to an aspect of the present disclosure, a multilayered capacitor includes a capacitor body including a plurality of dielectric layers and a plurality of internal electrodes; and external electrodes disposed on both end portions of the capacitor body and connected to exposed portions of the internal electrodes, respectively. Each of the external electrodes includes: a conductive layer disposed on the capacitor body and connected to the internal electrodes; an inner nickel (Ni) layer with phosphorus (P) dispersed therein as an impurity, and covering the conductive layer; and an outer noble metal layer with phosphorus (P) dispersed therein as an impurity and covering layer the conductive layer.

In an embodiment of the present disclosure, the outer noble metal layer may be a palladium (Pd) layer with phosphorus (P) dispersed therein as the impurity.

In an embodiment of the present disclosure, the inner nickel (Ni) layer may have a phosphorus content of more than 4% by weight and 8% by weight or less, based on a total weight of the inner nickel layer.

In an embodiment of the present disclosure, the outer noble metal layer may have a phosphorus content of 2% by weight or more and 6% by weight or less, based on a total weight of the outer noble metal layer.

In an embodiment of the present disclosure, a thickness of the inner nickel (Ni) layer may be greater than a thickness of the outer noble metal layer.

In an embodiment of the present disclosure, each of the external electrodes may not contain a tin (Sn) layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred embodiments of the present disclosure will be described with reference to the accompanying drawings.

However, embodiments of the present disclosure may be modified into various other forms, and the scope of the present disclosure is not limited to the following embodiments.

Further, embodiments of the present disclosure may be provided to more fully explain the present disclosure to those skilled in the art.

Shape and size of elements in drawings may be exaggerated for clarity.

The same reference numerals may be used for the same elements in the same reference numerals in drawings of respective embodiments.

In addition, 'including or comprising' an element throughout the specification refers to not excluding other elements, but further including other elements, unless specifically stated otherwise.

Hereinafter, in order to clearly explain embodiments of the present disclosure, when directions of a capacitor body 110 are defined, X, Y, and Z refer to a longitudinal direction, a width direction, and a thickness direction of the capacitor body 110, respectively. Further, in this embodiment, the Z direction may be used to have the same concept as a stacking direction in which dielectric layers are stacked.

Figure 1:
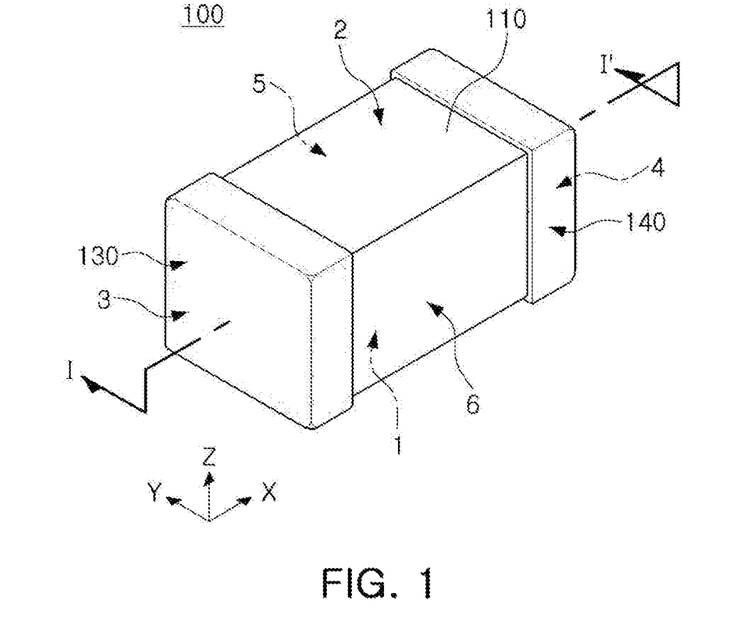
FIG. 1 is a perspective view schematically illustrating a multilayered capacitor according to an embodiment of the present disclosure.
Figure 2A:
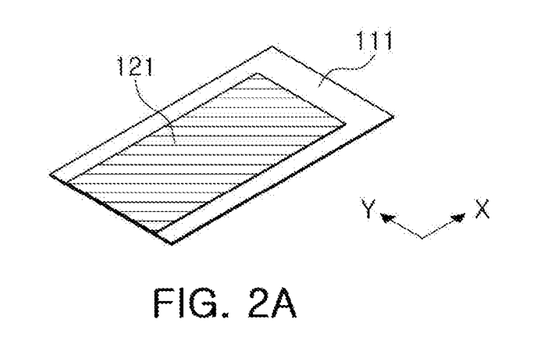
FIGS. 2A and 2B are plan views illustrating first and second internal electrodes applied to the multilayered capacitor of FIG. 1, respectively.
Figure 2B:
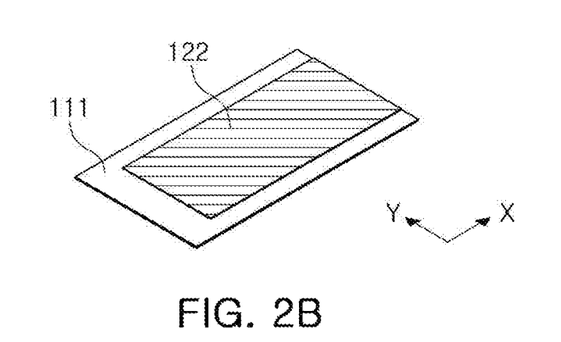
Figure 3:
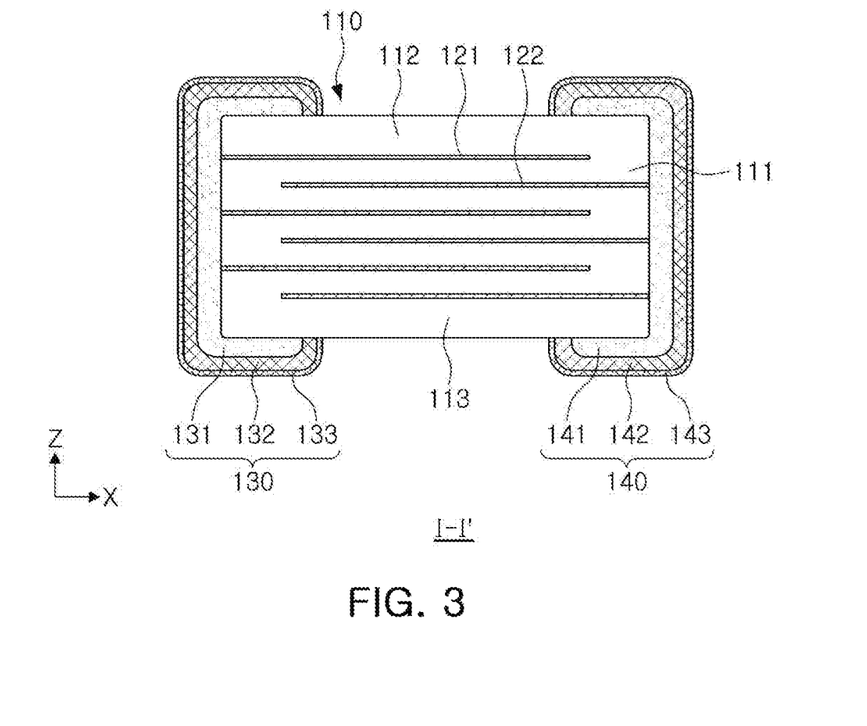
FIG. 3 is a cross-sectional view taken along line I-I' in FIG. 1.
Figure 4:
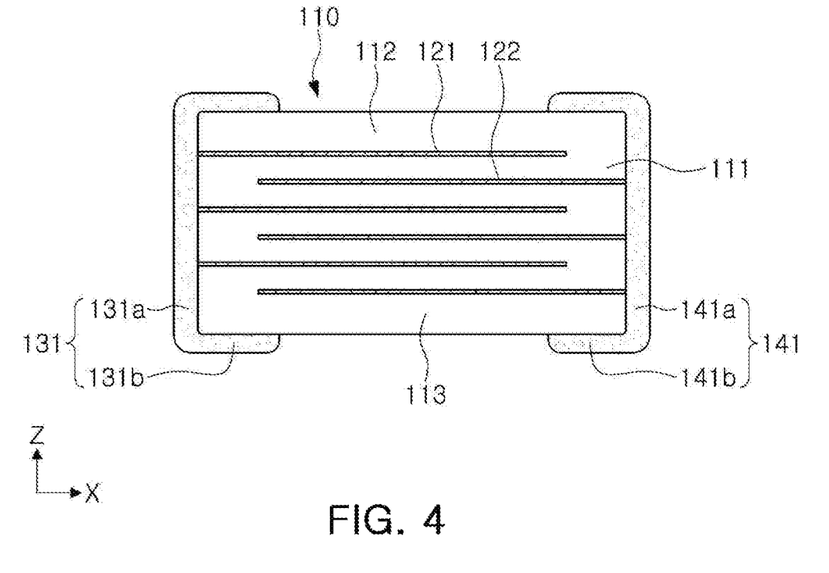
FIG. 4 is a cross-sectional view illustrating that only the conductive layers of the external electrodes in FIG. 3 are formed.
Figure 5:
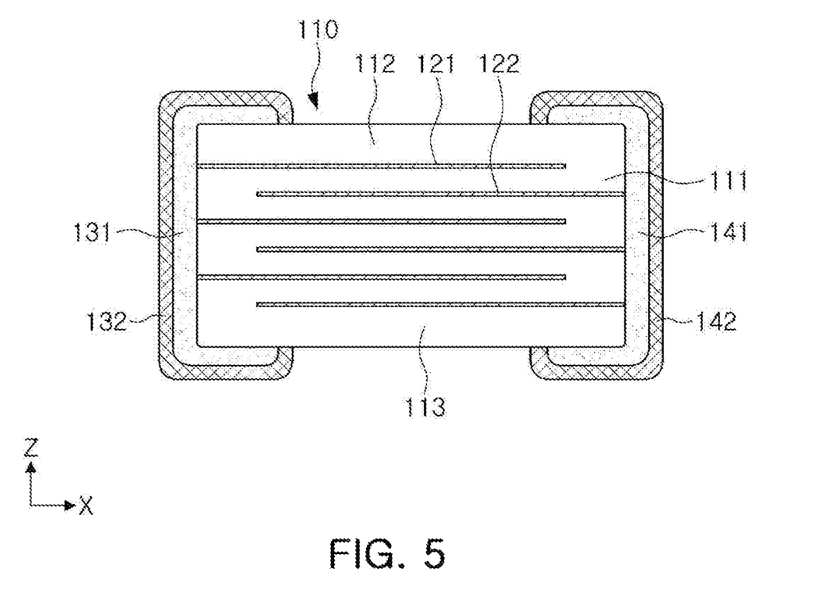
FIG. 5 is a cross-sectional view illustrating that the inner plated layers are further formed in the external electrodes in FIG. 4.

FIG. 1 is a perspective view schematically illustrating a multilayered capacitor according to an embodiment of the present disclosure, FIGS. 2A and 2B are plan views illustrating first and second internal electrodes applied to the multilayered capacitor of FIG. 1, respectively, FIG. 3 is a cross-sectional view taken along line I-I' in FIG. 1, FIG. 4 is a cross-sectional view illustrating that only the conductive layers of the external electrodes in FIG. 3 are formed, and FIG. 5 is a cross-sectional view illustrating that the inner plated layers are further formed in the external electrodes in FIG. 4.

Referring to FIGS. 1 to 5, a multilayered capacitor 100 according to the present embodiment may include a capacitor body 110, and first and second external electrodes 130 and 140.

The capacitor body 110 may be formed by stacking a plurality of dielectric layers 111 in a Z direction, and then sintering the stacked dielectric layers 111. In this connection, a boundary between the dielectric layers 111 adjacent to each other in the capacitor body 110 may be integrated in a degree that it is difficult to confirm the boundary without using a scanning electron microscope (SEM).

The capacitor body 110 may have a generally hexahedral shape, but the present disclosure is not limited thereto. Shape and dimensions of the capacitor body 110, and the number of stacked layers of the dielectric layers 111 are not limited to those illustrated in the drawings of the present embodiment.

In this embodiment, for convenience of explanation, two surfaces of the capacitor body 110 facing each other in a Z direction may be defined as first and second surfaces 1 and 2, respectively; two surfaces of the capacitor body 110 connected to the first and second surfaces 1 and 2 and facing each other in an X direction may be defined as third and fourth surfaces 3 and 4, respectively; and two surfaces of the capacitor body 110 connected to the first and second surfaces 1 and 2, connected to the third and fourth surfaces 3 and 4, and facing each other in an Y direction may be defined as fifth and sixth surfaces 5 and 6, respectively. Further, in this embodiment, amounting surface of the multilayered capacitor 100 may be the first surface 1 of the capacitor body 110.

The dielectric layers 111 may include a ceramic material having a high dielectric constant, for example, a barium titanate($BaTiO_3$)-based, a strontium titanate($SrTiO_3$)-based ceramic powder, or the like, but are not limited thereto.

Further, a ceramic additive, an organic solvent, a plasticizer, a binder, a dispersant, and the like may be further added to the dielectric layer 111, together with the ceramic powder.

The ceramic additive may be, for example, a transition metal oxide or a transition metal carbide, a rare earth element, magnesium (Mg), aluminum (Al), or the like.

The capacitor body 110 may include an active region serving as a portion contributing to capacity formation of the capacitor, and upper and lower covers 112 and 113 formed respectively on upper and lower surfaces of the active region in the Z direction as upper and lower margin portions.

The upper and lower covers 112 and 113 may have the same material and configuration as the dielectric layer 111, except that they do not include internal electrodes.

The upper and lower covers 112 and 113 may be formed by stacking a single dielectric layer or two or more dielectric layers on upper and lower surfaces of the active region in the Z direction, respectively; and may basically serve to prevent first and second internal electrodes 121 and 122 from being damaged by physical or chemical stress.

The first and second internal electrodes 121 and 122 may be electrodes to which different polarities are applied, may be alternately arranged in the Z direction with the dielectric layer 111 interposed therebetween, and may be configured such that one end thereof is exposed through the third and fourth surfaces 3 and 4 of the capacitor body 110, respectively.

In this case, the first and second internal electrodes 121 and 122 may be electrically insulated from each other by the dielectric layer 111 interposed therebetween.

End portions of the first and second internal electrodes 121 and 122 alternately exposed through the third and fourth surfaces 3 and 4 of the capacitor body 110 may be in contact with and may be electrically connected to the first and second external electrodes 130 and 140 disposed on the third and fourth surfaces 3 and 4 of the capacitor body 110, respectively, to be described later.

In this embodiment, when a predetermined voltage is applied to the first and second external electrodes 130 and 140, electric charges may be accumulated between the first and second internal electrodes 121 and 122.

In this case, electrostatic capacity of the multilayered capacitor 100 may be proportional to overlapped area of the first and second internal electrodes 121 and 122, which overlap each other in the active region in the Z direction.

Materials for forming the first and second internal electrodes 121 and 122 are not particularly limited, and may be formed using a noble metal material such as platinum (Pt), palladium (Pd), and palladium-silver (Pd—Ag) alloy, and the like, and a conductive paste made of one or more materials of nickel (Ni) and copper (Cu).

In this case, a method of printing the conductive paste may use a screen printing method, a gravure printing method, or the like, but the present disclosure is not limited thereto.

The first and second external electrodes 130 and 140 may be provided at voltages of different polarities, may be disposed on both end portions of the capacitor body 110 in the X direction, and may be in contact with and may be electrically connected to each of exposed portions of the first and second internal electrodes 121 and 122, respectively.

The first and second external electrodes 130 and 140 may include first and second conductive layers 131 and 141 formed on the capacitor body 110 to be connected to the first and second internal electrodes 121 and 122; first and second inner plated layers 132 and 142 formed to cover the first and second conductive layers 131 and 141, respectively; and first and second outer plated layers 133 and 143 formed to cover the inner plated layer, respectively.

The first conductive layer 131 may include a first connection portion 131a and a first bent portion 131b.

The first connection portion 131a may be formed on the third surface 3 of the capacitor body 110, and may be connected to an exposed portion of the first internal electrode 121. The first bent portion 131b may be a portion extending from the first connection portion 131a to a portion of the first surface 1 of the capacitor body 110.

In this case, the first bent portion 131b may further extend to a portion of the fifth and sixth surfaces 5 and 6, and a portion of the second surface 2 in the capacitor body 110, to improve fixation strength, and the like.

The second conductive layer 141 may include a second connection portion 141a and a second bent portion 141b.

The second connection portion 141a may be formed on the fourth surface 4 of the capacitor body 110, and may be connected to an exposed portion of the second internal electrode 122. The second bent portion 141b may be a portion extending from the second connection portion 141a to a portion of the first surface 1 of the capacitor body 110.

In this case, the second bent portion 141b may further extend to a portion of the fifth and sixth surfaces 5 and 6, and a portion of the second surface 2 in the capacitor body 110, to improve fixation strength, and the like.

The first and second conductive layers 131 and 141 may include at least one of copper (Cu) and silver (Ag), and may further include a glass, an epoxy, and the like, in addition thereto.

The first and second inner plated layers 132 and 142 may be include nickel (Ni) and phosphorus (P). For example, the first and second inner plated layers 132 and 142 may mainly contains nickel (Ni) and also include phosphorus (P) as an impurity dispersed in the first and second inner plated layers 132 and 142. For another example, the first and second inner plated layers 132 and 142 may be plated nickel (Ni) layers with phosphorus (P) as an impurity dispersed therein.

The first and second inner plated layers 132 and 142 may be formed by plating a first metal layer including nickel and phosphorus, on the first and second conductive layers 131 and 141.

In this case, the first and second inner plated layers 132 and 142 may be formed by an electroless plating process, respectively. When the first and second inner plated layers 132 and 142 are formed by the electroless plating process, the formed first and second inner plated layers 132 and 142 may have better corrosion resistance, and may be generally carried out the plating process evenly at every position to have a uniform plating thickness, relative to the coated film formed by an electrolytic plating process, without having any difference in plating characteristics relative to those formed by the electrolytic plating process.

In addition, in the electrolytic plating process, a dummy such as a steel ball or the like may be further added to electrically conduct in a barrel plating operation. As in the present embodiment, when the electroless plating process is performed, only a plated body may be plated without any dummy. Therefore, a plating preparation operation and a defect selection operation of a plated body after a plating operation may be performed more easily.

The content of phosphorus in the first and second inner plated layers 132 and 142 may be more than 4% by weight and 8% by weight or less, based on the total weight of the first and second inner plated layers 132 and 142, respectively.

In the following Table 1, corrosion resistance may be confirmed by a salt spray test, and it can be confirmed that the longer the time, the better the corrosion resistance.

TABLE 1

| # | Content of P (wt %) | Corrosion Resistance | Max. Plating Rate (um/hr) |
|---|---|---|---|
| 1 | 0 | | |
| 2 | 3 | 24 hr | 20 |
| 3 | 4 | 24 hr | 20 |
| 4 | 5 | 96 hr | 25 |
| 5 | 6 | 96 hr | 25 |
| 6 | 7 | 96 hr | 25 |
| 7 | 8 | 96 hr | 25 |
| 8 | 11 | 1000 hr | 15 |
| 9 | 12 | 1000 hr | 15 |

In this case, phosphorus may play a role of determining characteristics of nickel coating. Referring to Table 1, #1, not including phosphorus (P), may be a condition that plating is not possible in the electroless plating process.

It can be confirmed that the corrosion resistance of the first and second inner plated layers 132 and 142 were reduced in the cases of #2 and #3 in which the content of phosphorus was 4 wt % or less.

It can be confirmed that precipitation rate of nickel was lowered in the cases of #8 and #9 in which the phosphorus content exceeds 8 wt %.

When the precipitation rate of nickel was lowered, the plating time becomes longer to form the same plating thickness. Therefore, manufacturing time of a product increased to reduce productivity thereof.

Thicknesses of the first and second inner plated layers 132 and 142 may be 1 μm or more and 10 μm or less. When the thicknesses of the first and second inner plated layers 132 and 142 are less than 1 µm, there may be problems that nickel coverage is insufficient, and the first and second conductive layers 131 and 141 are exposed. When the thicknesses of the first and second inner plated layers 132 and 142 are more than 10 µm, excessive plating time may be required.

The first and second outer plated layers 133 and 143 may include palladium (Pd) and phosphorus (P). The content of phosphorus in the first and second outer plated layers 133 and 143 may be 2% by weight or more and 6% by weight or less, based on the total weight of the first and second outer plated layers 133 and 143, respectively. For example, the first and second outer plated layers 133 and 143 may mainly contain palladium (Pd) and also include phosphorus (P) as an impurity dispersed in the first and second outer plated layers 133 and 143. For another example, the first and second outer plated layers 133 and 143 may be plated palladium (Pd) layers with phosphorus (P) as an impurity dispersed therein.

The first and second outer plated layers 133 and 143 may be formed by plating a second metal layer containing palladium and phosphorus on the first and second inner plated layers 132 and 142 respectively by the electroless plating process.

Since the first and second outer plated layers 133 and 143 serve to prevent the nickel components in the first and second inner plated layers 132 and 142 from being oxidized, the first and second outer plated layers 133 and 143 may be preferably formed thin by using a material including a noble metal with relatively low oxidation, as compared to nickel.

For example, the thicknesses of the first and second outer plated layers 133 and 143 may be less than the thickness of the first and second inner plated layers 132 and 142, respectively. When the thicknesses of the first and second outer plated layers 133 and 143 increase, there is a high possibility that problems such as breakage of the plated layer, and the like, may occur.

When the first and second outer plated layers 133 and 143 are formed by the electroless plating process, the formed first and second outer plated layers 133 and 143 may have better corrosion resistance, and may be generally carried out the plating process evenly at every position to have a uniform plating thickness, relative to the coated film formed by an electrolytic plating process, without having any difference in plating characteristics relative to those formed by the electrolytic plating process.

A multilayered capacitor of this embodiment may be a product which is mounted on a substrate by using a conductive adhesive and which a reliability at a temperature of 150° C. or higher is required.

The first and second outer plated layers 133 and 143 may be portions of the substrate that may be in contact with the conductive adhesive when they are mounted on the substrate, may not deteriorate bonding force with the substrate, and may have no reliability problem at high temperature, due to no tin contained.

According to an embodiment of the present disclosure, a decrease in bonding force between a conductive adhesive and a plated layer may be prevented to prevent a mounting failure of a multilayered capacitor, even when high reliability is required in a case in which the multilayered capacitor is mounted on a substrate using a conductive adhesive.

While example embodiments have been shown and described above, it will be apparent to those skilled in the art that modifications and variations could be made without departing from the scope of the present disclosure as defined by the appended claims.

What is claimed is:

1. A multilayered capacitor comprising:
    a capacitor body including a plurality of dielectric layers and a plurality of internal electrodes; and
    external electrodes disposed on both end portions of the capacitor body and connected to exposed portions of the internal electrodes, respectively,
    wherein the external electrodes include an inner plated layer including nickel (Ni) and phosphorus (P),
    wherein the external electrodes further include a conductive layer disposed on the capacitor body and connected to the internal electrodes, and
    wherein the inner plated layer covers the conductive layer so as to be spaced apart from the exposed portions of the internal electrodes.

2. The multilayered capacitor according to claim 1, wherein the inner plated layer has a phosphorus content of more than 4% by weight and 8% by weight or less, based on a total weight of the inner plated layer.

3. The multilayered capacitor according to claim 2, wherein the inner plated layer mainly contains nickel (Ni) and includes phosphorus (P) as an impurity dispersed in the inner plated layer.

4. The multilayered capacitor according to claim 1, wherein the capacitor body comprises first and second surfaces facing each other, third and fourth surfaces connected to the first and second surfaces and facing each other, and fifth and sixth surfaces connected to the first and second surfaces and connected to the third and fourth surfaces, and comprises the plurality of internal electrodes alternately exposed through the third and fourth surfaces of the capacitor body with the dielectric layer interposed therebetween.

5. The multilayered capacitor according to claim 1, wherein the capacitor body comprises first and second surfaces facing each other, third and fourth surfaces connected to the first and second surfaces and facing each other, and fifth and sixth surfaces connected to the first and second surfaces and connected to the third and fourth surfaces, and comprises the plurality of internal electrodes alternately exposed through the third and fourth surfaces of the capacitor body with the dielectric layer interposed therebetween,
    wherein the conductive layers of the external electrodes comprise connection portions respectively disposed on the third and fourth surfaces of the capacitor body and connected to the exposed portions of the internal electrodes, and bent portions extending from the connection portions to a portion of the first surface of the capacitor body.

6. The multilayered capacitor according to claim 1, wherein the inner plated layer is formed by plating a first metal layer including nickel and phosphorus on the conductive layer by an electroless plating process.

7. The multilayered capacitor according to claim 1, wherein the conductive layer comprises at least one of copper or silver.

8. The multilayered capacitor according to claim 1, wherein the inner plated layer has a thickness of 1 µm to 10 µm.

9. The multilayered capacitor according to claim 1, wherein the external electrodes includes an outer plated layer including palladium (Pd) and phosphorus (P), and covering the inner plated layer.

10. The multilayered capacitor according to claim 9, wherein the outer plated layer is formed by plating a second metal layer including palladium and phosphorus on the inner plated layer by an electroless plating process.

11. The multilayered capacitor according to claim 9, wherein a thickness of the inner plated layer is greater than a thickness of the outer plated layer.

12. The multilayered capacitor according to claim 9, wherein the outer plated layer has a phosphorus content of 2% by weight or more and 6% by weight or less, based on a total weight of the outer plated layer.

13. The multilayered capacitor according to claim 12, wherein the outer plated layer mainly contains palladium (Ni) and includes phosphorus (P) as an impurity dispersed in the outer plated layer.

14. The multilayered capacitor according to claim 1, wherein the external electrodes do not contain a tin (Sn) layer.

* * * * *